(12) United States Patent
Sharma et al.

(10) Patent No.: US 7,952,767 B2
(45) Date of Patent: May 31, 2011

(54) METHOD FOR COHERENT WATERMARK INSERTION AND DETECTION IN COLOR HALFTONE IMAGES

(75) Inventors: Gaurav Sharma, Webster, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1192 days.

(21) Appl. No.: 11/615,407

(22) Filed: Dec. 22, 2006

(65) Prior Publication Data

US 2008/0151311 A1    Jun. 26, 2008

(51) Int. Cl.
*H04N 1/40* (2006.01)
*G06K 15/00* (2006.01)

(52) U.S. Cl. .................. 358/3.28; 358/534; 358/3.06

(58) Field of Classification Search .............. 358/3.28, 358/534, 3.06; 382/100
See application file for complete search history.

(56) References Cited

U.S. PATENT DOCUMENTS

| | | | |
|---|---|---|---|
| 5,543,935 | A | 8/1996 | Harrington |
| 5,673,121 | A | 9/1997 | Wang |
| 5,790,703 | A | 8/1998 | Wang |
| 6,072,591 | A | 6/2000 | Harrington |
| 6,263,086 | B1 | 7/2001 | Wang |
| 6,636,616 | B1 | 10/2003 | Harrington |
| 6,721,063 | B1 | 4/2004 | Harrington |
| 6,731,409 | B2 | 5/2004 | Wang |
| 6,844,941 | B1 | 1/2005 | Sharma et al. |
| 7,006,659 | B2 * | 2/2006 | Kim et al. .................... 382/100 |
| 2007/0002410 | A1 * | 1/2007 | Majewicz .................... 358/534 |

OTHER PUBLICATIONS

A European Search Report dated Mar. 27, 2009 for corresponding European patent application EP 07122709.4.
Fu et al.: "Watermarking technique for color halftone images"; 2004. Proceedings. (ICASSP ' 04); IEEE International Conference, Montreal,CA May 17-24, 2004, Piscataway, NJ, USA,IEEE, vol. 3, May 17, 2004 , pp. 381-384, XP010718206.

* cited by examiner

*Primary Examiner* — Charlotte M Baker
(74) *Attorney, Agent, or Firm* — Duane C. Basch; Basch & Nickerson LLP (57) ABSTRACT

A method for generating an authenticable color image, the color image including a plurality of color separations, wherein an authentication image inserted in the multicolor image is not readily visually perceptible, includes halftoning image data corresponding to a first color separation using a single halftone screen, wherein the halftone screen includes means for generating an authentication image in a color image; and halftoning image data corresponding to a second color separation using the halftone screen and dot placement information for the image data corresponding to the first color separation to form a multicolor image; wherein halftoning of image data corresponding to the second color separation includes placing dots for the second color separation in thresholds of the halftone screen relative to those thresholds occupied by the first color separation in the halftone screen in accordance with a predetermined relationship.

15 Claims, 7 Drawing Sheets

METHOD FOR COHERENT WATERMARK INSERTION AND DETECTION IN COLOR HALFTONE IMAGES

This application relates generally to methods of embedding digital watermarks in printed halftone images, and more particularly, to a method for embedding color digital watermarks in printed halftone images.

BACKGROUND & SUMMARY

Watermarks have long been used in the printing industry to identify the source or origin of a document. Generally, a watermark appears as a faint pattern in an image, which is visible only when the original document is viewed in a particular manner. Unless a counterfeiter had access to the watermarked paper, it would be difficult for him to reproduce the document without showing its inauthenticity. That is to say, without the paper on which the original image was originally printed, the copy should be readily detectable. However, as people move away from the use of watermarked papers for cost and other practical reasons, it is still necessary to identify the source or origin of a document image.

The introduction of the plain paper copier has resulted in a proliferation of paper copies of paper originals. A similar result is happening to electronic images, given the easy availability of digital scanners and quick and widespread access to images throughout the Internet. It is now very difficult for the creator of an image to generate an electronic original, for which he can be assured that illegal copies will not be spread to third parties. The use of a digital watermark is a technology that aims to prevent that spread, by incorporating an identifying mark within an image that allows one to identify the source of the image in an electronic copy. It is important that the identifying mark not be disturbing or distracting to the original content of the image, while at the same time, allowing easy identification of the source. The watermarks could be added either by the scanner, as or after the image is acquired, or by the halftoning software.

Watermark identification may be accomplished by embedding a digital watermark in a digital or printed page that will identify the owner of rights to the image. Watermarking can take two basic forms, visible or perceptible, and invisible or imperceptible. Visible watermarks are marks such as copyright logos or symbols or logos that are imprinted into the digital or printed image to be distributed. The presence of the watermark is made clearly visible in the image or rendered document in a way that makes it difficult to remove without damaging the image or document. The presence of the visible watermark does not harm the usefulness of the image, but it deters the use of the image without permission. However, visible watermarks may interfere with the use of the image or with the image aesthetics. The visible watermark is also a potential target for fraud, in that it is possible for a fraudulent copier of the image to identify the location of the watermark and attempt to reproduce the image without the watermark or try to transfer the watermark to another image.

Invisible watermarks are marks such as copyright symbols, logos, serial numbers, other identifiers, etc. that are embedded into digital or printed images in a way which is not easily discernible or perceptible by the unaided eye. At a later time, the information embedded in these watermarks can be derived or "retrieved" from the images to aid identification of the source of the image, including the owner and the individual to whom the image is sold. Such watermarks are useful for establishing ownership when ownership of an image is in dispute. They would be less likely to be useful as a deterrent to the theft of the image. While either or both visible or invisible watermarks are desirable in an image, they represent different techniques for either preventing copying or detecting copying. It is anticipated that document producers may wish to use both kinds of protection.

Embedded watermarks in printed halftone images, which can subsequently be detected using a visual aid or using a watermark detection algorithm on a scan of the image are of interest in wide range of applications. U.S. Pat. No. 5,790,703 to Shen-ge Wang for "Digital Watermarking Using Conjugate Halftone Screens," describes a method for generating watermarks in black and white halftone printing using stochastic screens. In U.S. Pat. No. 5,790,703, monochrome digital watermarks are embedded as correlations in the halftone screen. U.S. Pat. No. 6,731,409 to Shen-ge Wang for "System and Method for Generating Color Digital Watermarks Using Conjugate Halftone Screens" extends the method of U.S. Pat. No. 5,790,703 to color printing. The method disclosed in U.S. Pat. No. 6,731,409 generates color watermarks by producing a halftone pattern in one or more color separations of the color document using a separate halftone screen for each separation. While the color contrast watermarks produced by U.S. Pat. No. 6,731,409 work well on digital bit-maps, the color watermarks are harder to detect in printed hardcopy. The contrast and signal-to-noise ratio of the color watermark produced can be quite weak because of screen interactions making it impractical for high resolution color printing applications. It is also harder to determine the shift required for performing a watermark estimation when detecting the watermark pattern in scanned images due to the use of different screens for the different color separations. What is needed is a method of generating color watermarks having good contrast and good signal-to-noise ratios for detection on scans of printed images.

Disclosed in embodiments herein is a method for generating color digital watermarks, which provides good contrast while maintaining good signal-to-noise ratios. Instead of using a separate screen for each separation, the method uses a single halftone screen for all color separations. In one embodiment, the method uses a stochastic halftone screen with an embedded watermark, i.e., a stochastic screen with a conjugate relationship to describe the location of the watermark. The conjugate relationship determines the placement or location of the dots corresponding to the digital watermark. A successive fill technique, such as the one described in U.S. Pat. No. 6,844,941 to G. Sharma et al. for Color Halftoning Using a Single Successive-Filling Halftone Screen, the contents of which are incorporated herein by reference in their entirety, may be used to color the dots forming the digital watermark within the halftone screen. For example, if an image has four separations, the successive fill technique will determine whether to color a particular dot black, cyan, magenta, yellow or not at all. By using a single halftone screen and a successive fill technique, the different separations work together to produce the watermark with a significantly higher signal to noise ratio. In addition, the use of a single screen significantly improves the synchronization for the watermark detection process.

For purposes of this disclosure, the term "screening" or "halftoning" refers to the process in which each pixel value of a 2D array of contone pixels is compared to one of a set of preselected thresholds (the thresholds may be stored as a 2D matrix and the repetitive pattern generated by this matrix is considered a halftone cell), which produces a binary output at each pixel according to the result of the comparison. The matrix of threshold values is often referred to as a "screen", and the process of generating the binary image from the contone image using the screen is called "screening" or halftoning.

Also disclosed herein is a method for generating an authenticable color image, the color image including a plurality of color separations, wherein an authenticable image inserted in the color image is not readily visually perceptible. According to one embodiment, the method includes providing a single halftone screen, wherein the single halftone screen comprises a plurality of pixel locations with associated threshold values; wherein the halftone screen has a plurality of cells, each cell having a first region and a second region, each cell being spatially offset from a neighboring cell by a first distance; wherein a first region of a first cell is substantially identical to a first region of a second cell, and a second region of the first cell is substantially conjugate to a second region of the second cell; halftoning image data corresponding to a first color separation using the single halftone screen, wherein a corresponding first set of screen pixel locations associated with a first set of threshold values are filled by the first color separation; halftoning image data corresponding to a second color separation using the single halftone screen, wherein a corresponding second set of screen pixel locations are filled by the second separation, the second set having threshold values successive to the first set of threshold values. When a first copy of the color image is spatially offset from a second copy of the color image by at least the first distance, at least a first cell of each of the first and second copy of the color image align with at least a second cell of the first and second copy of the color image, and contrast of the identical and conjugate regions become visible to form the authentication image. The single halftone screen may be a stochastic screen.

The method can be expanded to cover placement and coloring of the third and fourth color separations. The method may further include halftoning image data corresponding to a third color separation using the single halftone screen, wherein a corresponding third set of screen pixel locations are filled by the third separation, the third set having threshold values successive to the second set of threshold values. For a fourth color separation, the method may further include halftoning image data corresponding to a fourth color separation using the single halftone screen, wherein a corresponding fourth set of screen pixel locations are filled by the fourth separation, the fourth set having threshold values successive to the third set of threshold values. The color separations may be black, magenta, cyan and yellow.

Further disclosed is a method for generating an authenticable color image, the color image including a plurality of color separations, wherein an authenticable image inserted in the color image is not readily visually perceptible. The embodiment includes providing a single stochastic halftone screen, the single stochastic halftone screen comprises a plurality of pixel locations with associated threshold values; wherein the stochastic halftone screen has a plurality of cells, each cell having a first region and a second region, each cell being spatially offset from a neighboring cell by a first distance; wherein a first region of a first cell is substantially identical to a first region of a second cell, and a second region of the first cell is substantially conjugate to a second region of the second cell; halftoning image data corresponding to the plurality of color separations using the stochastic halftone screen; further comprising, for each pixel, summing image values corresponding to the plurality of color separations in a predetermined order; comparing sums image values of at least the first and second color separations to the threshold values in the stochastic halftone screen; determining placement and color of the pixel in accordance with a predetermined relationship based on the comparison; wherein, when a first copy of the color image is spatially offset from a second copy of the color image by at least the first distance, at least a first cell of each of the first and second copy of the color image align with at least a second cell of the first and second copy of the color image, and contrast of the identical and conjugate regions become visible to form the authentication image.

For two separations, the predetermined relationship may be: if ($i1$>screen_threshold), printing a pixel with the colorant of the first separation; if (($i1+i2$)>screen_threshold) and ($i1$<screen_threshold)), printing a pixel with the colorant of the second separation; and if (($i1+i2-M$)>screen_threshold), printing a pixel with the colorant of the second separation; where $i1$, $i2$ are the image values of the image data for the first color separation and the second color separation, respectively, screen_threshold is the value of a threshold in the stochastic halftone screen, and M is the maximum threshold value. Note that with the use of this method a given pixel may be printed with none, one, or both of the colorants. The predetermined relationship may be extended to a third separation and include: if (($i1+i2+i3$)>screen_threshold) and (($i1+i2$)<screen_threshold)), printing a pixel with the colorant of the third separation; if (($i1+i2+i3-M$)>screen_threshold) and (($i1+i2-M$)<screen_threshold), printing a pixel with the colorant of the third separation; and if (($i1+i2+i3-M$)>screen_threshold), printing a pixel with the colorant of the third separation.

A method for generating an authenticable color image, the color image including a plurality of color separations, wherein an authentication image inserted in the color image is not readily visually perceptible, according to another embodiment of the method for generating an authenticable color image, includes halftoning image data corresponding to a first color separation using a single halftone screen, wherein the single halftone screen includes means for generating an authentication image in a color image; and halftoning image data corresponding to a second color separation using the single halftone screen and dot placement information for the image data corresponding to the first color separation to form a multicolor image; wherein halftoning of image data corresponding to the second color separation includes placing dots for the second color separation in thresholds of the halftone screen relative to those thresholds occupied by the first color separation in the halftone screen in accordance with a predetermined relationship.

Examples of predetermined relationships include: placing thresholds for the second color separation adjacent to the thresholds of the first color separation, placing thresholds for the second color separation at a predetermined distance from the thresholds of the first color separation, and generating a modified value for the second separation by adding the "halftone error" from the first separation and obtaining the second separation by screening the modified value for this separation. For example, halftoning of image data corresponding to the second color separation may include placing halftone dots for the second color separation in thresholds of the stochastic halftone screen determined by: determining a halftone error between the first color separation image data and the second color separation image data; and adding the halftone error to the second color separation image data.

DETAILED DESCRIPTION

One embodiment of a method for generating an authenticable color image allows for a color pattern to be used on a color document, where the color pattern can be generated using a stochastic halftoning process to produce a desirable image. Using such techniques, the random nature of the stochastic screen affords the opportunity to include a unique authentication procedure in conjunction with correlations between different stochastic screens. As a primer to the principles of color stochastic halftone screening, monochrome stochastic halftone screening is discussed below. In various exemplary embodiments, this method for generating an authenticable color image uses the stochastic screening method described in U.S. Pat. No. 5,673,121 to Wang, hereby incorporated by reference in its entirety.

Each location in an image may be called a "pixel" or "dot". In an array defining an image in which each item of data or image signal provides a value, each value indicating the color of a location may be called a "pixel value" or "dot value". In monochrome stochastic halftone screening of monochromatic documents, halftone images are generated from constant gray-scale inputs by a screen matrix with N elements. If the overlap between adjacent pixels is ignored, a screen cell with n black pixels and N−n white pixels simulates the input with a gray scale (g) equal to $$g=(N-n)/N,$$

where $0 \leq n \leq N$, or $0 \leq g < 1$. The visual appearance of this pattern depends on whether the black pixels or the white pixels are minorities. If the black pixels are minorities, for example, $0.5 \leq g \leq 1.0$, the best visual appearance of the halftone pattern occurs when all black pixels are "evenly" distributed, in other words, each black pixel should "occupy" 1/n, or 1/(1−g)N, fraction of the total area of the screen. Therefore, the average distance of adjacent black pixels should be equal to $\alpha(1-g)^{-1/2}$, where $\alpha$ is independent of gray levels. On the other hand, if the white pixels are minorities, i.e., $0 \leq g \leq 0.5$, each white pixel should "occupy" 1/(N−n) or 1/gN, fraction of the total area and the average distance of adjacent white pixels should be equal to $\alpha g^{-1/2}$. An idealized stochastic dithering screen is defined as a threshold mask generating halftone images, which satisfy the above criterion for all gray levels.

In general, input gray-scale images are specified by integer numbers, $G(x, y)$, where $0 \leq G \leq M$. As a result, the dithering screen should have M different threshold values spanning from zero to M−1. Moreover, at each level, there should be (N/M) elements having the same threshold value T. The ultimate goal of designing a stochastic screen is to distribute the threshold values T so that the resulting halftone images are as close as possible to the ones generated by an idealized stochastic screen.

Choosing an arbitrary pair of pixels from the dithering screen, it is assumed that the threshold values for these two pixels should be $T_1 = T(x_1, y_1)$ and $T_2 = T(x_2, y_2)$, respectively, where $(x_1, y_1)$ and $(x_2, y_2)$, are the coordinates of these pixels. As the result of dithering a constant input G, the outputs $B_1 = B(x_1, y_1)$ and $B_2 = B(x_2, y_2)$ have the following possible combinations:

$$B_1 = 1 \text{ and } B_2 = 1, \quad \text{if } G \geq T_1 \text{ and } G \geq T_2;$$
$$B_0 = 1 \text{ and } B_2 = 0, \quad \text{if } G < T_1 \text{ and } G < T_2;$$
$$B_1 \neq B_2,$$

where B=1 represents a white spot and B=0 represents a black spot for printing. When one output pixel is black and another is white, the distance between these two pixels is irrelevant to the visual appearance for the reasons outlined above. When both pixels are white, the visual appearance under the following case must be considered:

If $M/2 \geq G$, $G \geq T_1$, and $G \geq T_2$.

In this case, both output pixels are white, and white spots are minorities. Therefore, the corresponding distance between $(x_1, y_1)$ and $(x_2, y_2)$ is relevant to the visual appearance of the halftone images. According to the analysis outlined above, this distance is greater or equal to $\alpha g^{-1/2}$, or $\alpha(G/M)^{-1/2}$, for outputs of an idealized stochastic screen. Among all G under this case, the critical case of G is the smallest one, or $G_c = \text{Max}(T_1, T_2)$, which requires the largest distance between the two pixels $(x_1, y_1)$ and $(x_2, y_2)$.

Similarly, when both dots or pixels appear as black dots or pixels, the visual appearance under the following case must be considered:

If $G \geq M/2$, $G < T_1$ and $G < T_2$.

Among all G under this case, the largest G is given by $G_c = \text{Min}(T_1, T_2)$, which requires the largest distance $\alpha(1-G_c/M)^{-1/2}$ between $(x_1, y_1)$ and $(x_2, y_2)$.

Mathematically, a merit function $q(T_2, T_2)$ can be used to evaluate the difference between the idealized stochastic screen and the chosen one. For example, the following choice (Eq. 1) may be used:

$$q(T_1, T_2) = \exp(Cd^2/d_c^2), \tag{1}$$

where $$d^2 = (x_1 - x_2)^2 + (y_1 - y_2)^2;$$
$$d_c^2 = M/[M - \text{Min}(T_1, T_2)], \quad \text{if } T_2 > M/2 \text{ and } T_1 > M/2,$$
$$d_c^2 = M/\text{Max}(T_1, T_2), \quad \text{if } T_2 \leq M/2 \text{ and } T_1 \leq M/2,$$
$$d_c^2 = 0, \text{ i.e., } q = 0, \quad \text{elsewhere; and } C \text{ is a constant.}$$

Since a dithering screen is used repeatedly for halftoning images larger than the screen, for any chosen pair of pixels from the dithering screen, the closest spatial distance in corresponding halftone images depends on the dithering method and should be used for the merit function. The overall merit function should include contributions of all possible combinations. In an experiment, the summation of $q(T_1, T_2)$ was for optimization, i.e.:

$$Q = \Sigma q(T_1, T_2), \quad (2)$$

where $\Sigma$ for all $(x_i, y_1)_{\neq(x_2, y_2)}$.

The design of stochastic screens then becomes a typical optimization problem. When the threshold values of a chosen screen are rearranged, the merit function can be evaluated to determine the directions and steps. Many existing optimization techniques can be applied to this approach. The simplest method is to randomly choose a pair of pixels and swap threshold values to see if the overall merit function Q is reduced. Since only those Q values related to the swapped pair need to be recalculation, the evaluation of Q does not consume significant computation time. All initial threshold values were randomly chosen by a standard random number generator.

Alternatively, the threshold assignments from an existing screen may be used. Besides the Gaussian function described by Eq. (1) as the merit function, other functions were tested, such as the Butterworth function and its Fourier transform. Other optimization functions are possible. For each iteration, a pair of pixels was randomly chosen from the dithering screen, their threshold values swapped and the change of the merit function Q was calculated. If Q is not reduced, the threshold values are restored. Otherwise, the next iteration is performed. The optimization process continues until a satisfied distribution of threshold values is achieved.

The issues discussed above regarding monochrome stochastic screens can be developed to produce an invisible color watermark in a halftoned color document in accordance with various exemplary embodiments of the stochastic halftone screening methods according to this method for generating an authenticable color image.

U.S. Pat. No. 5,790,703 describes a method for generating watermarks in black and white halftone printing using conjugate stochastic screens, and is incorporated herein by reference in its entirety. Two screens, $T_1(x, y)$ and $T_2(x, y)$, having the same size and the same shape, are conjugate, if for all elements $(x, y)$ the corresponding pair of threshold values have the following relation (Eq. 3):

$$T_1(x,y) + T_2(x,y) = M, \quad (3)$$

where M is the number of total possible levels. By the thresholding rule, which defines the binary status of the output $B(x, y)$ based on the relation between an input value $G(x, y)$ and the threshold value $T(x, y)$ provides:

$$B(x, y) = 1, \quad \text{if } G(x, y) \geq T(x, y);$$
$$B(x, y) = 0, \quad \text{if } G(x, y) < T(x, y).$$

It is interesting to notice that if the input image has a constant value, $G(x, y) = M/2$, the two binary outputs $B_1(x, y)$ and $B_2(x, y)$, generated by two conjugated screens $T_1(x, y)$ and $T_2(x, y)$ in Eq. 3, are exactly binary complement for all pixels. In other words, any black pixel of $B_1$ has a corresponding white pixel of $B_2$ at the same pixel location $(x, y)$, and vice versa. If the input level $G(x, y) < M/2$, the binary complement relation between $B_1$ and $B_2$ is still true for all white spots, as minorities in this case. If $G(x, y) > M/2$, the binary complement relation between $B_1$ and $B_2$ is true for all black spots, also as minorities in this case.

From the previous discussion on stochastic screens, it is not difficult to see that the conjugate screen $T_2(x, y)$, of a well-designed stochastic screen $T_1(x, y)$, is also a well-designed stochastic screen, because for every output level of $T_2$ there is a corresponding level of $T_1$, which is optimized during the screen design process. The principal difference is that if the level of $T_1$ is with black minorities, the corresponding level of $T_2$ is with white minorities, and similarly so for $T_1$ with white minorities. Consider the following two cases:

In a first example, two identical halftone images are generated using a stochastic screen $T_1(x, y)$ and printed on two transparencies, respectively. If the two transparencies are laid over each other and viewed in a show-through mode, the overall appearance depends on the relative position between the two halftone images. The maximal, or the brightest, show-through can be obtained only with a perfect pixel-to-pixel alignment of the two images without any lateral shift or rotation. It should be appreciated that this statement is an analogue of a two-dimensional auto-correlation of the halftone image. The maximal show-through corresponds to the peak value of the auto-correlation, or in other words, the positive peak of the correlation.

In another example, two halftone images are generated by two conjugated stochastic screens, $T_1(x, y)$ and $T_2(x, y)$ defined by Eq. 3, respectively. The cross-correlation between the two halftone images, generated by two conjugated screens, behaves opposite to the auto-correlation described above such that, after the two halftone images are laid over each other and perfectly aligned, the overall appearance reaches the minimal, or the darkest, show-through. Mathematically, this corresponds to a negative peak of the cross-correlation, or simply, the negative peak of the correlation.

These two examples can be relatively combined so that some portions of the second halftone image are generated by using the conjugate screen $T_2(x, y)$ while the remaining portion of the second image are generated by the same stochastic screen $T_1(x, y)$, as used to generate the first halftone image. Laying a transparency of the second image over the first one, a strong contrast occurs between the brightest and the darkest show-through.

Practically, combining the two portions of the second halftone image described above can be realized by designing a new stochastic screen $T_2(x, y)$, which has the same shape and size as the first stochastic screen $T_1(x, y)$. A portion of the new stochastic screen $T_2$ is made conjugate to the corresponding portion of the first stochastic screen $T_1$ while other portion of the new stochastic screen $T_2$ is made identical to a portion of the first stochastic screen $T_1$. By modifying the optimization condition for stochastic-screen design as described, for example, in U.S. Pat. No. 5,673,121, it is possible to make the boundary between the two portions of by the second screen visually seamless. Therefore, the halftone images generated by the new stochastic screen $T_2$ appear just as good as halftone images generated by the first stochastic screen $T_1$. Although the watermark, defined by the shape of the portion for the conjugate relation, is visually imperceptible, the information is hidden, or incorporated into the halftone images generated by the stochastic screen in a manner according to the degree of correlation.

A concrete example of the monochrome technique described in U.S. Pat. No. 5,790,703 will be described: Define two conjugate halftone screens as two thresholding masks having identical shape and size and satisfying such conjugate relation that $T1(i, j) = 255 - T2(i, j)$ for all corresponding pixels (i, j), where T1 and T2 are the thresholding values of the two masks, respectively. An exemplary pair of conjugate halftone screens is shown in Table 1 (note that the halftone screens in Table 1 can be considered two halftone cells of a single halftone screen). Note that the sum of two values in any pair of corresponding pixels shown in Table 1 is 255.

TABLE 1

A pair of conjugate halftone screen cells.

| 1 | 172 | 24 | 232 | 80 | 168 | | 254 | 83 | 231 | 23 | 175 | 87 |
|---|---|---|---|---|---|---|---|---|---|---|---|---|
| 228 | 88 | 154 | 104 | 208 | 40 | | 27 | 167 | 101 | 151 | 47 | 215 |
| 32 | 200 | 56 | 36 | 8 | 252 | | 223 | 55 | 199 | 219 | 247 | 3 |
| 219 | 116 | 240 | 137 | 188 | 16 | | 36 | 139 | 15 | 118 | 67 | 239 |
| 65 | 160 | 103 | 209 | 72 | 138 | | 190 | 95 | 152 | 46 | 183 | 117 |
| 202 | 125 | 172 | 96 | 248 | 40 | | 53 | 130 | 83 | 159 | 7 | 215 |

Figure 1:
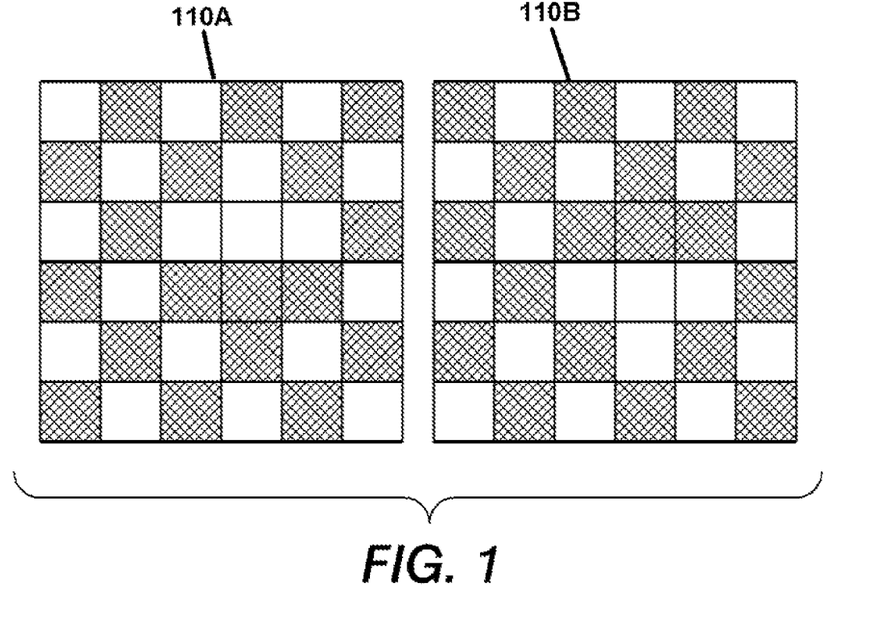
FIG. 1 illustrates a "conjugate" pair of binary patterns generated using a monochrome conjugate halftone screen.
Figure 2:
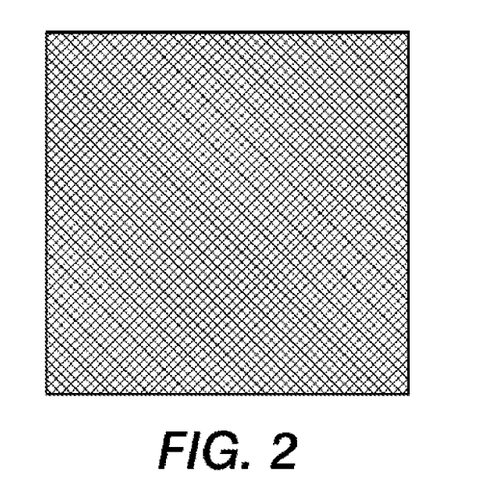
FIG. 2 illustrates the output of overlaying the two halftone images shown in FIG. 1.
Figure 3:
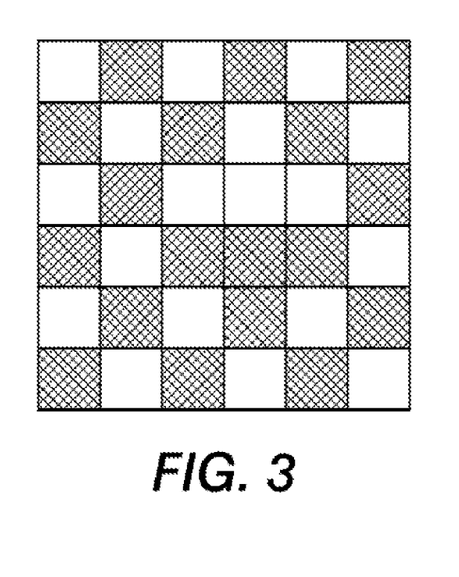
FIG. 3 illustrates the output of overlaying two identical halftone images, shown as the left hand pattern of FIG. 1.

If an input with a constant level 128 is halftoned by the conjugate screen cells shown in Table 1, the result will be a "conjugate" pair of binary patterns 110A, 110B as shown in FIG. 1. By overlaying the two binary patterns in FIG. 1, it is possible to obtain a complete black pattern as shown in FIG. 2. On the other hand, if two identical halftone patterns are overlaid together, the output is exactly the same binary pattern as the overlaid patterns. For example, FIG. 3 shows the result of overlaying two identical patterns as the left binary image in FIG. 1.

Consider the pair of halftone screen cells, as shown in Table 2, with the upper three rows (a first region of a first halftone cell and a first region of the second halftone cell) of the two screens/cells are conjugate while the lower three rows (a second region of the first halftone cell and a second region of the second halftone cell) are identical.

TABLE 2

A pair of halftone screens, with a conjugate upper half and an identical lower half.

| 1 | 172 | 24 | 232 | 80 | 168 | | 254 | 83 | 231 | 23 | 175 | 87 |
|---|---|---|---|---|---|---|---|---|---|---|---|---|
| 228 | 88 | 154 | 104 | 208 | 40 | | 27 | 167 | 101 | 151 | 47 | 215 |
| 32 | 200 | 56 | 36 | 8 | 252 | | 223 | 55 | 199 | 219 | 247 | 3 |
| 219 | 116 | 240 | 137 | 188 | 16 | | 219 | 116 | 240 | 137 | 188 | 16 |
| 65 | 160 | 103 | 209 | 72 | 138 | | 65 | 160 | 103 | 209 | 72 | 138 |
| 202 | 125 | 172 | 96 | 248 | 40 | | 202 | 125 | 172 | 96 | 248 | 40 |

Figure 4:
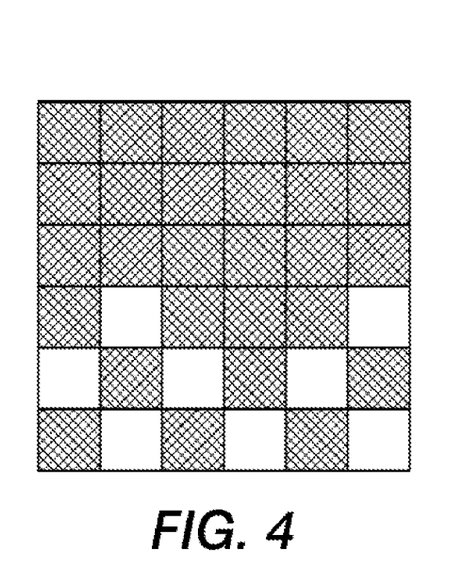
FIG. 4 illustrates the output of overlaying two halftone images generated by the pair of halftone screens described in Table 2.

The overlaying of two binary patterns generated by these two screens and a constant input 128 will appear as the pattern shown in FIG. 4.

Figure 5:
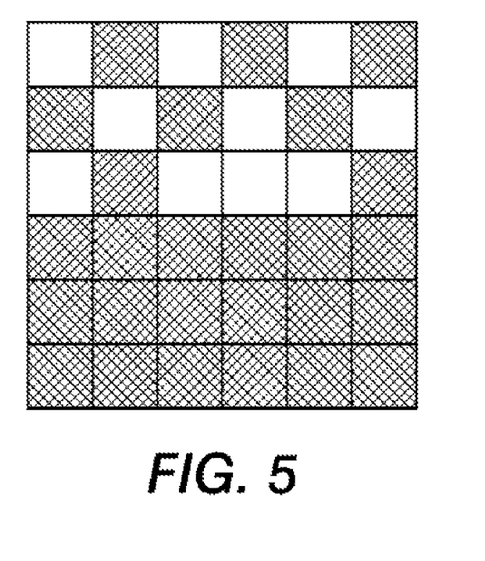
FIG. 5 illustrates the output of overlaying two halftone images generated by the pair of halftone screens described in Table 3.

Similarly, a pair of halftone screen cells with an identical first three rows (second region) and a conjugate second three rows (first region), shown in Table 3, will generate an overlaying pattern as shown in FIG. 5.

TABLE 3

A pair of halftone screens, with an identical upper half and a conjugate lower half.

| 1 | 172 | 24 | 232 | 80 | 168 | | 1 | 172 | 24 | 232 | 80 | 168 |
|---|---|---|---|---|---|---|---|---|---|---|---|---|
| 228 | 88 | 154 | 104 | 208 | 40 | | 228 | 88 | 154 | 104 | 208 | 40 |
| 32 | 200 | 56 | 36 | 8 | 252 | | 32 | 200 | 56 | 36 | 8 | 252 |
| 219 | 116 | 240 | 137 | 188 | 16 | | 36 | 139 | 15 | 118 | 67 | 239 |
| 65 | 160 | 103 | 209 | 72 | 138 | | 190 | 95 | 152 | 46 | 183 | 117 |
| 202 | 125 | 172 | 96 | 248 | 40 | | 53 | 130 | 83 | 159 | 7 | 215 |

Figure 6:
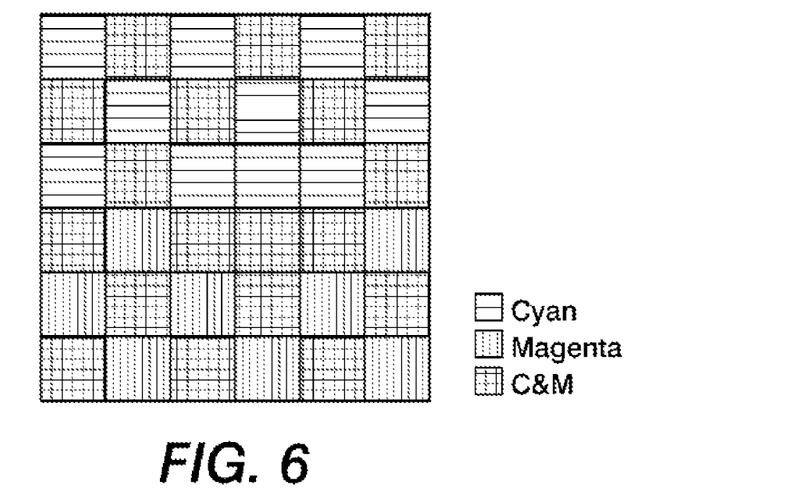
FIG. 6 illustrates the result of combining the output of FIG. 4 in cyan and the output of FIG. 5 in magenta.
Figure 7:
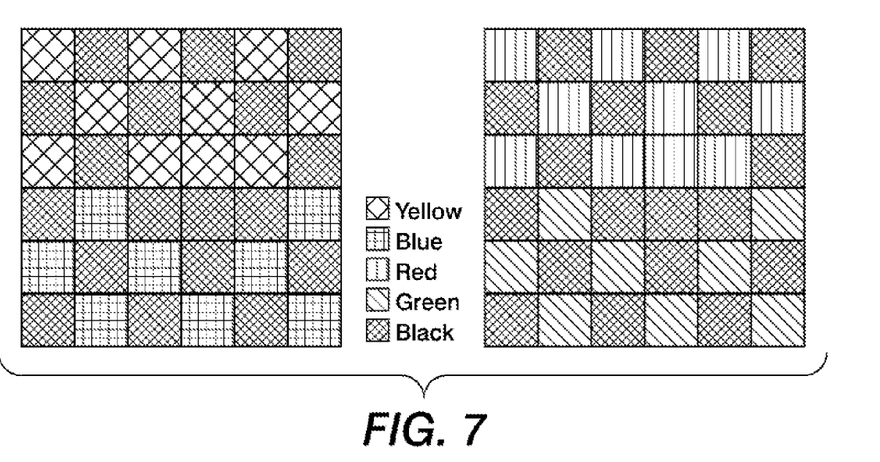
FIG. 7 illustrates the result of combining in yellow and blue (left) and red and green (right)

The method described in U.S. Pat. No. 6,731,409 extends the monochrome conjugate screen method described in U.S. Pat. No. 5,790,703 for generating monochrome watermarks for color halftoning to create color contrast by using combinations of conjugate screens and identical screens (a different halftone screen is used for each color separation). For example, apply the conjugate halftone screen shown in Table 2 to one channel, say cyan, and apply the conjugate halftone screen shown in Table 3 to another channel, say magenta. The result provides the highest contrast between cyan and magenta. FIG. 6 illustrates the result of combining the output of FIG. 4 in cyan and the output of FIG. 5 in magenta, where it is assumed no yellow and black inputs are applied. Since most applications of color halftoning have 3 or 4 color channels, other variations of combining conjugate screens and identical screens are possible and two examples of the results are shown in FIG. 7. FIG. 7 illustrates the result of combining in yellow and blue (left) and red and green (right). As noted earlier, this method sometimes produces images having less than desirable contrast and low signal-to-noise ratios for detection.

The method for generating an authenticable color image described herein extends the single conjugate halftone screen method to produce color digital watermarks. The method for generating an authenticable color image proposes a significantly improved system for color digital watermarks using a single halftone screen for all color separations. In one embodiment, the method uses successive filling with a stochastic screen designed with an embedded watermark, the different separations work together in producing the watermark. The resulting halftone screen process produces a significantly higher signal to noise ratio for the watermark. The method is applicable to single halftone screen techniques such as successive filling halftoning using stochastic screens and similar halftoning techniques. The method offers a significant improvement in watermark signal to noise ratio over the previously disclosed color watermarking method.

When the method is applied to a stochastic halftone screen, the authenticable color image (or watermark) is embedded in the single stochastic screen. The stochastic halftone screen includes a plurality of cells, each cell having at least one first region and at least one second region, wherein each cell is spatially offset from a neighboring cell by at least a first distance; wherein a first region of a first cell of the stochastic halftone screen is substantially identical to a first region of a second cell of the stochastic halftone screen, and a second region of the first cell of the first stochastic halftone screen is substantially conjugate to a second region of the second cell of the first stochastic halftone screen. The conjugate region provides the watermark in the resulting halftone image. When the watermark is to be detected from a scan or other electronically captured image of the printed color document, distortions in the printing and scanning process can make the alignment difficult. In such circumstances, the identical regions of the two cells can help determine the alignment between the scans of the regions corresponding to the two cells and thereby aid the process of "synchronization" of the image with a shifted version for the purpose of watermark detection. In this respect, the disclosed system and method are also advantaged because the same screen is utilized for the different separations and therefore more of the printed dot locations in the two cells will be common in the identical screen regions.

The same stochastic halftone screen is used for all color separations. Successive-filling is a technique proposed for color halftoning wherein a single halftone screen is used for multiple separations, the separations are allocated "successive levels" of the screen. Thus if the input CMYK (Cyan, Magenta, Yellow, Black) color image is spatially constant with values for the separations arranged in a specific order as $i1$, $i2$, $i3$, and $i4$ (for instance, typically in order darkest to lightest these would correspond to K, M, C, and Y, respectively) the first $i1$ levels of the halftone screen i.e. 1 through $i1$ are used for the first separation, the next $i2$ levels of the halftone screen, i.e. $i1+1$ through $i1+i2$ are used for the second separation, the next $i3$ levels of the halftone screen, i.e. $i1+i2+1$ through $i1+i2+i3$ are used for the third separation, and the next $i4$ levels, i.e. $i1+i2+i3+1$ through $i1+i2+i3+i4$ are used for the fourth separation. It is understood that in this process if the levels of the halftone screen are exhausted, they are re-used employing exactly the same order as for the initial screen.

The successive fill process may be mathematically performed using several equivalent methods. One method is the method described in U.S. Pat. No. 6,844,941. An alternate method may include the following steps: summing image values corresponding to the plurality of color separations in a pre-determined order; comparing the image value sums of at least two separations to the stochastic screen thresholds; and for each dot, selecting the dot's color and placement based on results of the comparisons. The following relationship may also be used:

if ($i1$>screen_threshold), printing a dot having the color of the first separation;

if ((($i1+i2$)>screen_threshold)) and ($i1$<screen_threshold))), printing a dot having the color of the second separation; and if (($i1+i2-M$)>screen_threshold), printing a dot having the color of the second separation;

where $i1$, $i2$ are the image values of the image data for the first color separation and the second color separation, respectively, screen_threshold is the value of a threshold in the stochastic halftone screen, and M is the maximum threshold value.

This relationship may be further extended to three and four color separations. For the third separation, the relation is given by:

if ((($i1+i2+i3$)>screen_threshold)) and (($i1+i2$)<screen_threshold)), printing a dot having the color of the third separation; and if ((($i1+i2+i3-M$)>screen_threshold)) and (($i1+i2-M$)<screen_threshold)), printing a dot having the color of the third separation;

if (($i1+i2+i3-2*M$)>screen_threshold), printing a dot having the color of the third separation;

Similarly, the process for the fourth separation is if ((($i1+i2+i3+i4$)>screen_threshold) and (($i1+i2+i3$)<screen_threshold)), printing a dot having the color of the third separation; and if ((($i1+i2+i3+i4-M$)>screen_threshold) and (($i1+i2+i3-M$)<screen_threshold)), printing a dot having the color of the third separation;

if ((($i1+i2+i3+i4-M$)>screen_threshold) and (($i1+i2+i3-M$)<screen_threshold)), printing a dot having the color of the third separation;

if (($i1+i2+i3-M$)>screen_threshold), printing a dot having the color of the third separation.

Since successive filling uses a single halftone screen for all the color separations, the watermarks in the different separations act in concert (unlike the color contrast halftone watermarks where the independent separations act independently). As a result the watermark pattern has a higher signal to noise ratio and the shift for obtaining the watermark pattern is also estimated more easily from the scan of a print bearing the embedded watermark.

Figure 8:
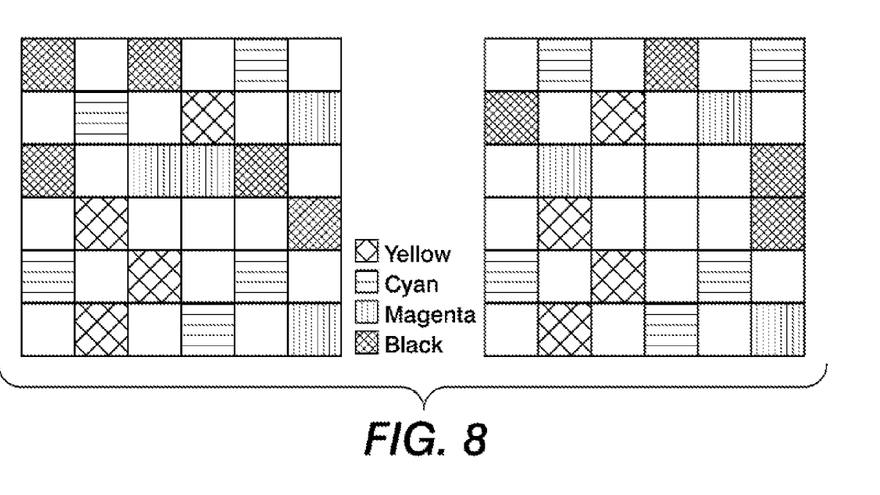
FIG. 8 illustrates halftone images generated by an input with CMYK values K=C=M=Y=32 and the screens shown in Table 2, using successive-filling in colorant order K, M, Y, C.
Figure 9:
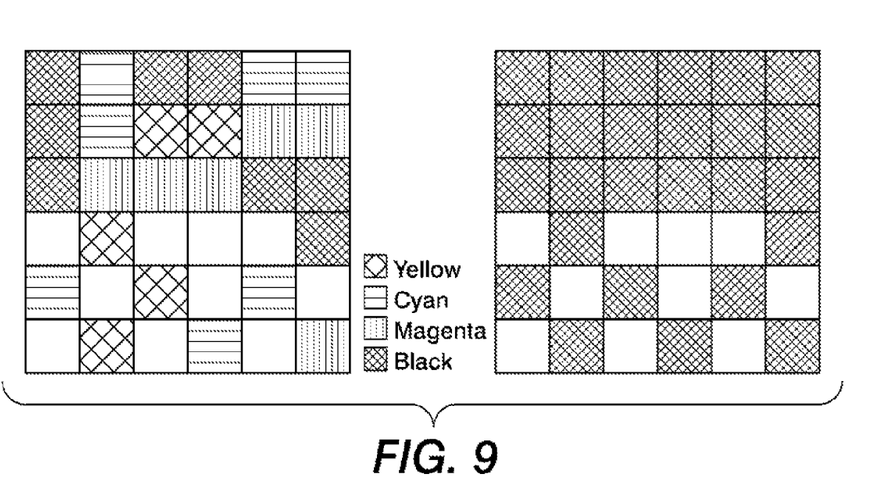
FIG. 9 illustrates the output of overlaying the two halftone images in FIG. 8.

For illustrating the method for generating an authenticable color image, consider the pair of screens shown in Table 2 and consider the result of halftoning a region with input CMYK values K=C=M=Y=32, using successive filling with the order black, magenta, cyan, yellow (increasing lightness order as is common for successive filling). The result of halftoning this color region with these two halftone screens is shown in FIG. 8 where the left hand side corresponds to the result of halftoning with the screen on the left in Table 2 and the right side corresponds to the result of halftoning with the screen on the right in Table 2. The result of overlaying these two halftone images (in the process of halftone detection) is shown in FIG. 9, where the image on the left hand side indicates the overlay in color and the image onto the right shows the result of detecting the presence of a halftone dot (of any colorant) on each pixel—for instance through the process of taking the minimum of RGB values in each pixel. From FIG. 9, it can be seen that the process of successive filling and detection of dots on each pixel makes the color halftoning watermark analogous to the black and white watermark thereby significantly improving its detectability.

While the bitmaps presented here illustrate the improvements with the method for generating an authenticable color image in halftone bitmaps, it is important to consider the full process of watermarking and detection wherein the halftone bitmaps are printed and scanned prior to detection of embedded information. Experiments were conducted to evaluate the performance of the new scheme and to compare it with color contrast watermarking.

In order to evaluate the proposed method for generating an authenticable color image and to compare its performance with the color-contrast watermarking method, an experiment was performed. A monochrome halftone stochastic screen with an embedded conjugate watermark in the shape of an X was designed. Two watermarked halftone bitmaps were created using this screen: the first bitmap used the existing color-contrast watermarking scheme disclosed in U.S. Pat. No. 6,731,409, hereby incorporated by reference in its entirety, and the second used the method for generating an authenticable color image with successive filling as described above.

Aspects of the disclosed system may be found in a color xerographic printing system. For example, the halftone bitmaps were printed on a Phaser 850 printer from Xerox Corporation at 300 dpi resolution. One print was printed with a color contrast watermark (U.S. Pat. No. 6,731,409) and a second print was printed with the successive fill color watermark generated by the method for generating an authenticable color image. The two printed images were scanned using a UMAX Powerlook desktop scanner 300 dpi resolution and a watermark detection algorithm, carried out on a workstation with hardware, software and circuitry (memory, processor, etc.) suitable for performing digital image processing operations (e.g., halftoning), was executed on the scans. The result of the watermark detection algorithm on the color contrast watermarked image showed that the watermark was extremely faint and visible only in certain regions. The result of the watermark detection algorithm on the successive fill color watermark showed the watermark "X" pattern was clearly visible over most smooth regions of the image. From the results, it is clear that the proposed successive filling color watermark offers a very significant improvement in detectability in comparison to existing methods.

The signal to noise ratio (SNR) of each watermark was also estimated using the watermark detection algorithm. The average SNR for the color contrast watermarking scheme is 0.88 and the average SNR for the successive filling watermarking scheme is 3.34. The much higher SNR for the successive filling watermarking is consistent with the visual results and indicates the significant improvement in performance offered by the method for generating an authenticable color image. The experimental results indicate that the method for generating an authenticable color image provides a very significant improvement in color halftone watermarks bringing this technology much closer to practical applications, most of which involve color.

While the description thus far has been directed to watermarking of color halftone images generated using stochastic halftone screens, the method of the proposed invention may also be applied for color data embedding using error diffusion. In one embodiment, this can be realized by adapting the monochrome halftone data embedding method disclosed in U.S. Pat. No. 6,636,616 to color using a successive filling technique such as the one described in U.S. Pat. No. 6,721,063. Both U.S. Pat. No. 6,636,616 and 6,721,063 are hereby incorporated by reference in their entirety.

Figure 10:
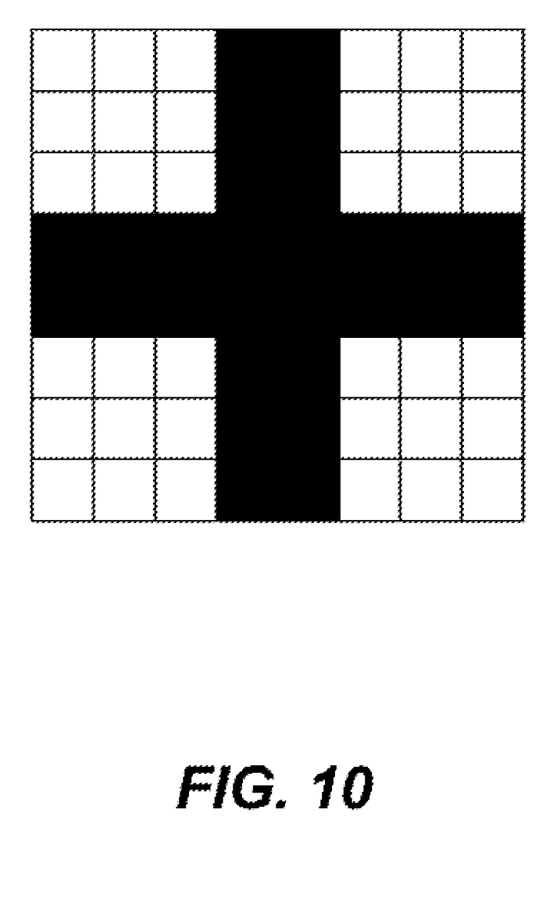
FIG. 10 illustrates a watermark to be included into an image.
Figure 11:
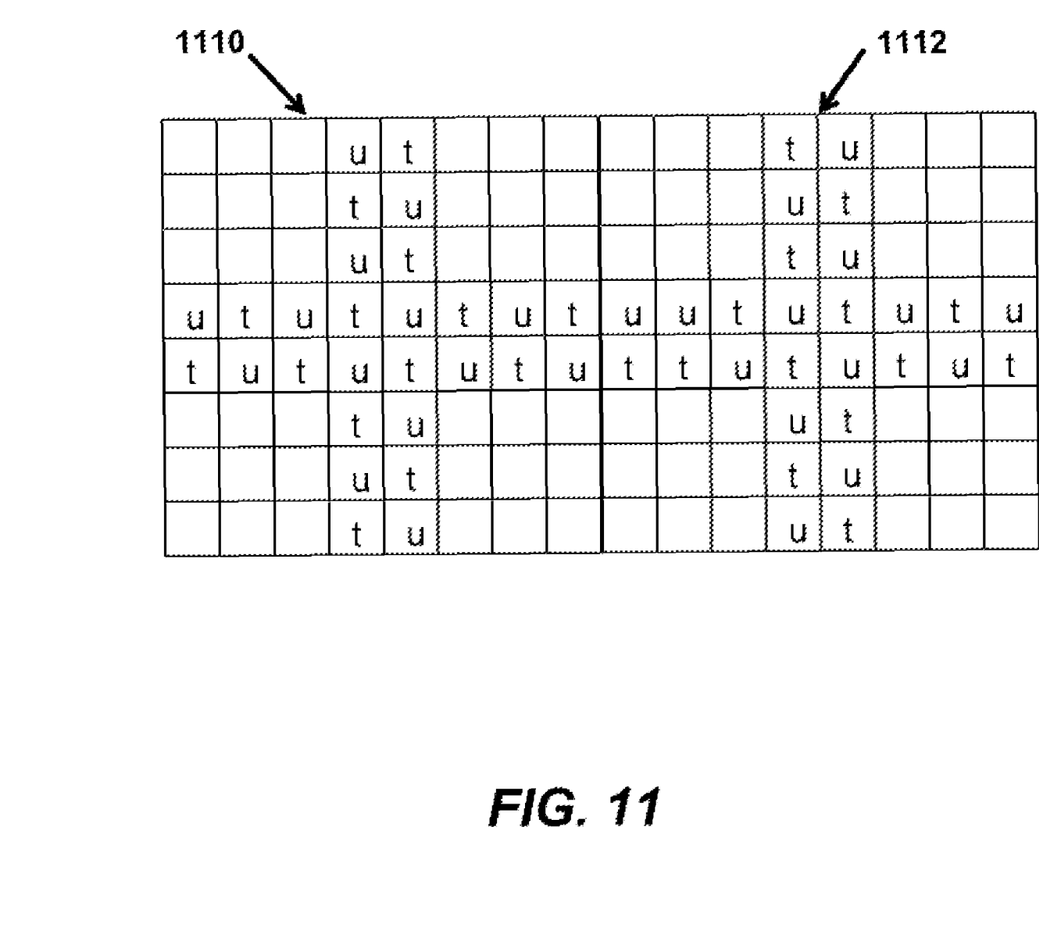
FIG. 11 illustrates a bias tile incorporating the watermark of FIG. 10.

This process is best illustrated by means of an example. It is to be noted that the example is for illustrative purposes and in actual practice several different realizations are possible. Suppose the pattern illustrated in FIG. 10 is to be embedded in a color halftone image consisting of CMYK planes. Embedding is accomplished by halftoning the multiple separations using a joint error diffusion method and introducing a bias in the error diffusion image halftoning process—through the addition of a watermark pattern dependent bias. An exemplary bias pattern is illustrated in FIG. 11, where it is twice the size of the watermark pattern to be introduced. The pattern is zero except in regions corresponding to the watermark pattern where it is takes complementary values in the left and right halves 1110 and 1112, respectively. This bias is added to the threshold for error diffusion. The values t and u may be chosen for instance as t=−u=64. The addition of this bias pattern to the threshold in the halftoning process favors the placement of printed halftone dots on pixels labeled as u's (because the threshold is lowered in these regions) and discourages the placement of dots in the pixels where the bias is t (because the threshold is raised in these regions). Since the bias pattern in FIG. 11 has the t's and the u's transposed on the right half in relation to their locations in the left half, the printed halftone dots in the output would have a propensity to lie in complementary locations. If the halftone image (or a suitable scan of the printed halftoned image) is shifted horizontally to the right by a displacement corresponding to half the size of the rectangle indicated in FIG. 11 and overlaid on itself, the dots in the regions corresponding to the "+" shaped watermark pattern would tend to lie on different locations while the dots in the regions outside the "+" shaped watermark pattern would tend to be randomly located in the shifted version. Thus the "+" shaped watermark pattern would appear as a darker region. The contrast of the watermark may be further improved by biasing the blank pixels shown in FIG. 2 to make dots in those regions have a higher propensity to lie in identical locations. The description thus far does not indicate how the color planes are accommodated; accordingly one algorithmic embodiment of the manner in which this may be accomplished is now presented:

Consider a CMYK (Cyan, Magenta, Yellow, Black) color image where the values for the separations are indicated in a specific order at pixel location (x,y) as i1(x,y), i2(x,y), i3(x,y), and i4(x,y), which are assumed to be distributed between 0 and 1 for our description in this part. Then the process may be described as follows:

Compute the sum of all colorants s(x,y)=i1(x,y)+i2(x,y)+i3(x,y)+i4(x,y)

Apply a multilevel error diffusion to the sum to quantize each pixel location to 0 (no dots), 1 (one colorant dot), 2 (two colorant dots), 3 (three colorant dots) and 4 (four colorants dots). This process can be achieved for instance by computing for each pixel a modified value i(x,y)=s(x,y)+e(x,y) where e(x,y) is the error diffused to the location (x,y) from previously processed locations in accordance with well-known error diffusion methods. Quantize i(x,y) to the four levels to obtain an output value o(x,y) as follows:

$$o(x, y) = \begin{cases} 0 & \text{if } i(x, y) \leq 0.5 + w(x, y) \\ 1 & \text{if } w(x, y) + 0.5 < i(x, y) \leq w(x, y) + 1.5 \\ 2 & \text{if } w(x, y) + 1.5 < i(x, y) \leq w(x, y) + 2.5 \\ 3 & \text{if } w(x, y) + 2.5 < i(x, y) \leq w(x, y) + 3.5 \\ 4 & \text{if } i(x, y) > w(x, y) + 3.5 \end{cases}$$

where w(x,y) is the bias at pixel location (x,y) determined in accordance with the watermark pattern as indicated above. Diffuse the quantization error i(x,y)−o(x,y) to the neighbors not processed yet in accordance with established error diffusion procedures.

Apply independent error diffusion with constraints to the individual separations to determine the colorants to be included as each of the locations identified in step 2. For example for the first separation, compute i1'(x,y)=i1(x,y)+e1(x,y) where e1(x,y) is the error diffused to the location (x,y) from previously processed locations of the first separation in accordance with well-known error diffusion methods. Similarly calculate i2'(x,y), i3'(x,y), i4'(x,y). For quantization of the values however use the constraints on the number of pixels to be printed that were previously established, i.e., if o(x,y) is non-zero, pick the largest o(x,y) values from i1'(x,y), i2'(x,y), i3'(x,y), i4'(x,y) and set the corresponding values for the corresponding outputs o1'(x,y), o2'(x,y), o3'(x,y), o4'(x,y) as 1 leaving other values as 0. For each of the separations compute and diffuse the quantization error to the neighbors not processed yet in accordance with established error diffusion procedures.

It will be appreciated that various of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for generating a color image carrying an embedded watermark image, the color image including a plurality of separations, wherein a watermark image inserted into the color image is not readily visually perceptible, comprising:
   a. providing a single halftoning process for the plurality of separations, wherein the halftoning process includes a periodic tile, each tile offset from its neighbors by a fixed displacement, and where said periodic tile includes a first region and a second region and a first part of the first region is substantially identical to a corresponding part of the second region, and a second part of the first region is substantially conjugate to a corresponding part of the second region;
   b. halftoning image data from the color image using the single halftoning process wherein a set of pixel locations associated with a first threshold value are filled by a first of the plurality of separations;
   c. halftoning the image data using the single halftoning process wherein a second set of pixel locations associated with second of the plurality of separations, the second set of pixel locations are filled successively to the first set of pixel locations, such that when a first copy of the color image is spatially offset from a second copy of the color image by an integral multiple of the fixed displacement, at least the first part of the first region aligns with a second part of the second region and a second part of the first region aligns with a first part of the second region and contrast of the identical and conjugate first and second parts become visible to reveal the watermark image.

2. The method of claim 1, wherein the single halftoning process comprises comparing the image values to a stochastic screen of thresholds.

3. The method of claim 2, further comprising halftoning image data corresponding to a third of the plurality of separations using the single stochastic screen of thresholds, wherein a third set of pixel locations associated with third of the plurality of separations, the third set of pixel locations are filled successively to the second set of pixel locations.

4. The method of claim 3, wherein the first color separation represents black, the second color separation represents magenta and the third color separation represents cyan.

5. The method of claim 2, further comprising:
   determining a first separation halftone error as the difference between the first color separation image data value and first color separation halftone image data output value; and
   adding the first separation halftone error to the second color separation image data prior to halftoning image data corresponding to the second color separation.

6. The method of claim 1 wherein the single halftoning method further comprises an error diffusion screen.

7. The method of claim 6 wherein the periodic tile comprises adding a tile of bias values to the theshold of the error diffusion screen, wherein at least one region of the tile raises the threshold, and at least one remaining region of the tile lowers the threshold.

8. The method of claim 6 wherein the error diffusion screen comprises
   a. first computing an error diffused value based upon a sum of the values of all of the plurality of separations to determine how many of the separations are to be printed at each pixel location,
   b. independently performing an error diffusion on each separation, and
   c. printing only the number of separations that has been determined in a.

9. The method of claim 8 wherein the separations to be printed are printed in order of increasing luminance impact, with the darkest separations printed first.

10. A method for generating an authenticable color image, the color image containing a plurality of separations, wherein an authenticable image inserted into the color image is not readily visible, comprising:
    receiving color image data containing a plurality of separations for the image to be authenticated;
    halftoning the color image data to generate a binary color image therefrom, wherein the halftoning includes a stochastic screen;
    adding a bias pattern to the halftoning, wherein the bias pattern is periodically and regularly repeated throughout the halftoned image, wherein the bias pattern comprises a stochastic mask with a first region and a second region, where a first part of the first region is substantially identical to a corresponding part of the second region, and where a second part of the first region is substantially conjugate to a corresponding part of the second region; and
    controlling the successive halftoning of each of the plurality of separations, wherein each successive separation fills pixels successive to the previously halftoned separation.

11. The method of claim 10 wherein halftoning further comprises determining a first separation halftone error between the first color separation image data and first color separation output halftone image data and adding the first separation halftone error to the second color separation image data prior to halftoning image data corresponding to the second color separation.

12. The method of claim 10 wherein halftoning comprises performing an error diffusion halftoning on the color image data.

13. The method of claim 12 wherein adding a bias pattern adds a bias value to the threshold of the error diffusion screen, which in some regions raises the threshold, and in the remaining regions lowers the threshold.

14. The method of claim 12 wherein halftoning includes performing a three step error diffusion halftoning on the color image.

15. The method of claim 14, where the halftoning first computes a multi level error diffused value based the sum of the values of all of the plurality of separations to determine a number of the separations to be printed at each pixel location, and then computes an error diffused value for each separation, and finally outputs only the number of separations that has been determined in the first step.

* * * * *